United States Patent [19]

Clark et al.

[11] Patent Number: 4,848,001
[45] Date of Patent: Jul. 18, 1989

[54] BLADE GUARD SYSTEM FOR ROTARY SAWS

[75] Inventors: Leonard R. M. Clark, Rock Hill, S.C.; Aaron C. Martenson, Matthews, N.C.

[73] Assignee: Textron Inc., Providence, R.I.

[21] Appl. No.: 167,717

[22] Filed: Mar. 14, 1988

[51] Int. Cl.[4] .............................................. B23D 45/16
[52] U.S. Cl. ......................................... 30/391; 30/388
[58] Field of Search ................. 30/296, 390, 388, 391, 30/151

[56] References Cited

U.S. PATENT DOCUMENTS 3,513,888  5/1970  Townsend et al. ............... 30/390 X
3,735,489  5/1973  Zatorsky, Jr. ....................... 30/390

Primary Examiner—Frank T. Yost
Assistant Examiner—Willmon Fridie, Jr.
Attorney, Agent, or Firm—Abraham Ogman

[57] ABSTRACT

A blade guard system for power driven rotary saws having a drive shaft arm rotatable between inboard and outboard cutting positions relative to the chassis, a blade guard disposed about a portion of the saw blade and rotatably attached to the saw blade shaft. An arcuate track slot is disposed on the inner wall of the blade guard adjacent to the drive shaft arm. A blade guard adjust arm is pivotally mounted at one end to the drive shaft arm and the other end of the blade guard adjust arm being releasably attachable at selected locations along the track slot to position the blade guard in desired protective positions. When the blade guard adjust arm is released from the track slot, rotation of the blade guard and the blade guard adjust arm to selected protective positions is permitted without the need to remove the blade guard or blade from the saw blade shaft. The construction and arrangement of the adjust arm, blade guard and track slot provide for improved resistance to fatigue failure of the blade guard as well as facilitating the change from inboard to outboard operating positions.

5 Claims, 4 Drawing Sheets

U.S. Patent  Jul. 18, 1989  Sheet 3 of 4  4,848,001
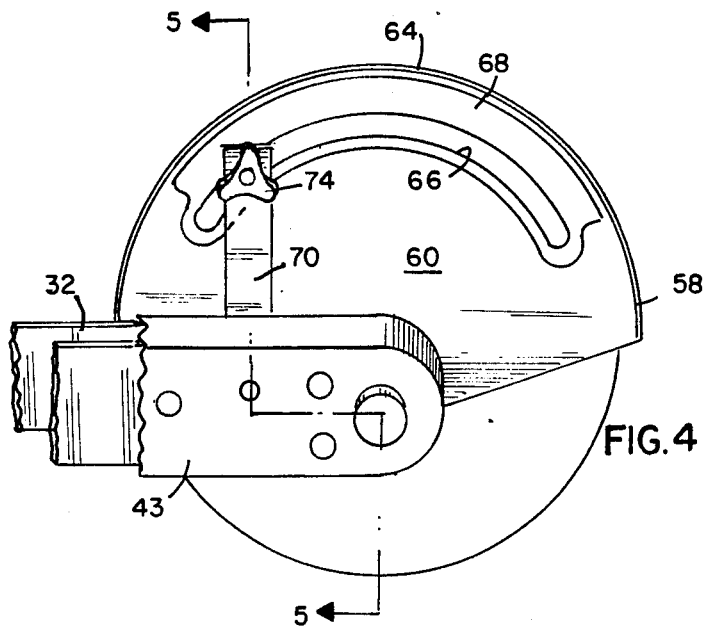
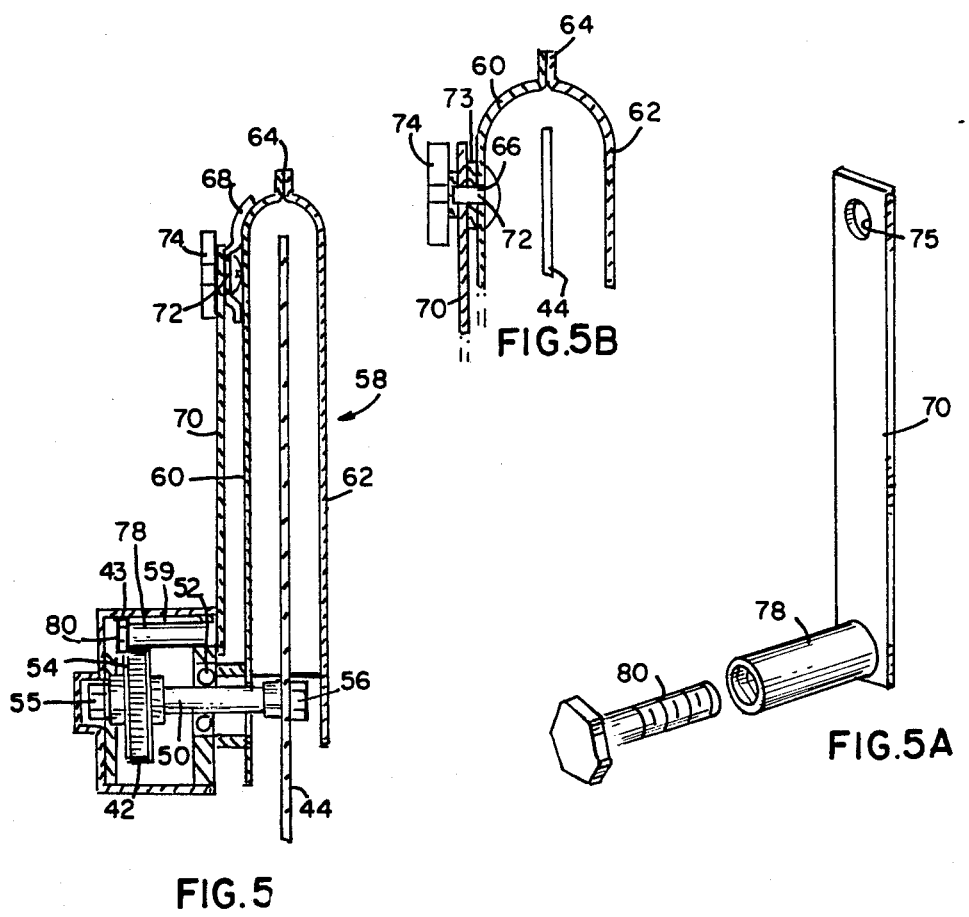

BLADE GUARD SYSTEM FOR ROTARY SAWS

BACKGROUND OF THE INVENTION

1. Field Of The Invention

The present invention relates to power driven rotary saws and more particularly to an improved blade guard system for power driven circular cutting wheels wherein the cutting wheel is changed from a relative inboard position to a relative outboard position.

2. Description Of The Prior Art

Traditionally rotary saws such as portable power driven circular saws are provided with a blade guard or protective cover for the circular cutting wheel or blade. For convenience the cutting wheel, whatever its form, is herein after referred to as the saw blade or blade. In such prior art devices the blade guard is attached to the saw shaft and provides for limited forward and backward rotational movement relative to the blade to achieve limited desirable protective positions.

For some cutting operations it is desirable to mount the saw blade inboard, for center cutting, for example, and in other operations it is desirable to mount the saw blade in the outboard position, for flush cutting, for example. Generally it can be said that when mounted on the inboard position, the saw blade is approximately in a vertical plane passing through the center of gravity of the motor assembly. When mounted on the outboard position, the saw blade is on the outboard side of the supporting arm and in position for cutting close to an obstruction. In some prior art devices, when changing between inboard and outboard cutting positions, it is necessary to remove the saw blade, blade guard or belt guard from the saw shaft and reattach in the new position. In the prior art device the blade guard is provided with a track slot or slots substantially adjacent the saw shaft for adjustment of the blade guard to forward and rearward positions to increase protection of the operator. Such track slots were generally releasably attached directly to the main drive shaft arm as associated belt guard devices. Such prior art arrangements have resulted in early fatigue failure of the blade guard.

In U.S. Pat. No. 3,518,888 there is disclosed a circular saw which is constructed so that the circular saw blade can be removed from the saw blade shaft and remounted on the other end of the shaft to provide selective mounting on either end of the shaft. The saw blade cover is also removed at the same time.

While such prior art devices have provided improvement in the area intended, there still exists a great need for a blade guard system which eliminates the need to remove the saw blade, blade guard or belt guard when changing between inboard and outboard blade positions. There is also a need to provide a blade guard system having improved resistance to fatigue failure.

Accordingly a principal desirable object of the present invention is to provide an improved blade guard system for rotary saws which eliminates the need for removing the saw blade and blade guard when changing between inboard and outboard saw cutting positions.

Another desirable object of the invention is to provide a blade guard system for rotary saws which is constructed and arranged so that during adjustment of the guard the guard is prevented from inadvertently rotating to a position where the operator is exposed to the blade.

Another desirable object of the present invention is to provide a blade guard system having improved resistance to fatigue failure.

A still further desirable object of the present invention is to provide a blade guard adjustment arm which is located in the same relative position for inboard or outboard blade cutting positions.

Another desirable object of the present invention is to provide a blade guard adjustment arm which provides for improved assessability of adjustment.

These and other desirable objects of the invention will in part appear hereinafter and will in part become apparent after consideration of the specification with reference to the accompanying drawings.

SUMMARY OF THE INVENTION

The present invention discloses a blade guard system for power driven rotary saws having a motor assembly and chassis, a drive shaft projecting at one side of the chassis, a drive shaft arm extending forwardly from the drive shaft side of the chassis, a saw shaft rotatably mounted on the drive shaft arm and extending to one side of the arm, a circular saw blade mounted on the saw shaft, a driving connection means between the drive shaft and the saw shaft, and the drive shaft arm being rotatable so as to rotate the saw shaft between inboard and outboard positions relative to the chassis. In accordance with the invention the blade guard system comprises a blade guard housing disposed about a portion of the saw blade having inner and outer side wall portions and an outer arcuate wall portion. Means are provided for rotatably attaching the inner housing wall of the blade guard to the saw shaft. An arcuate track slot is disposed on the inner housing wall portion adjacent to the outer arcuate wall portion. A blade guard housing adjustment arm is provided and includes means for pivotally mounting one end of the adjustment arm to the drive shaft arm and other means for releasably attaching the other end of the blade guard adjustment arm at selected locations along the track slot to position the blade guard housing in desired protective positions. In accordance with the invention when the adjustment arm is released from the track slot, rotation of the blade guard housing and the adjustment arm to a relative protective position is permitted, which can be diametrically opposite when the saw blade is rotated between inboard and outboard positions, without the need to remove the blade guard or blade from the blade shaft. The construction and arrangement of the adjustment arm, blade guard and track slot provide for improved resistance to fatigue failure as well as facilitating the change from inboard to outboard operating positions.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein:

FIG. 4 is an enlarged fragmentary perspective view of the blade guard system in accordance with the invention;

FIG. 5 is a cross sectional view taken along the line 5—5 of FIG. 4;

FIG. 5A is an enlarged perspective view of the blade guard adjustment arm of FIG. 5;

FIG. 5B is a fragmentary sectional view of an alternate embodiment of the track slot in accordance with the present invention;

DETAILED DESCRIPTION OF PREFERRED EMBODIMENT(S)

Figure 1:
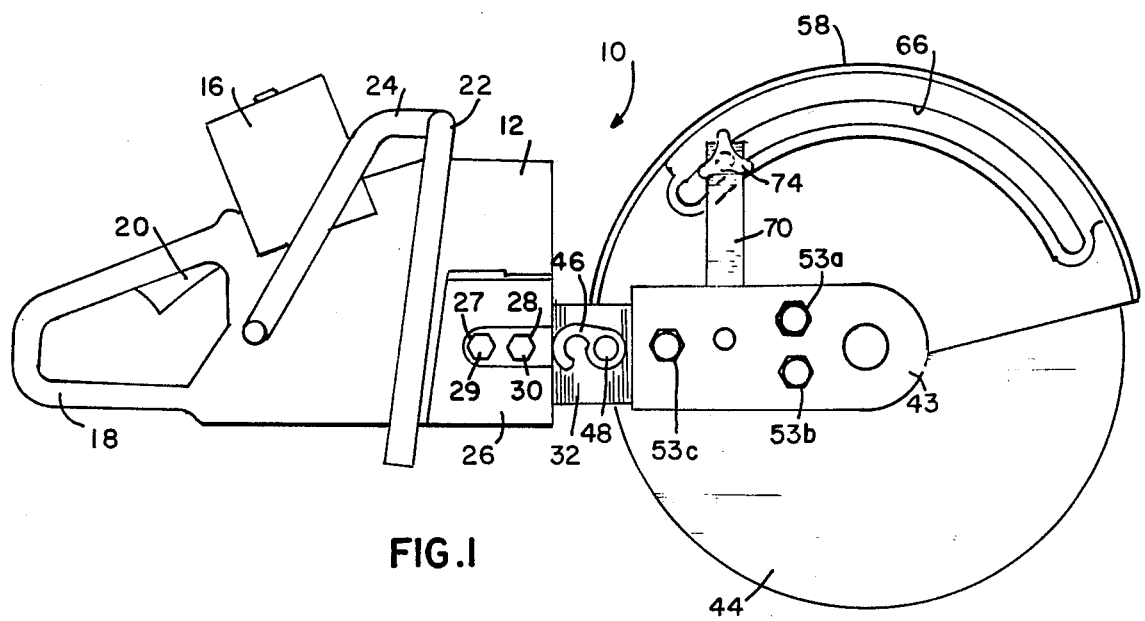
FIG. 1 is a right side elevation view of a portable rotary saw with the saw blade in the inboard position and having a blade guard system in accordance with the present invention.

Referring now to the drawings and more particularly to FIGS. 1-5B, a portable power driver rotary saw, designated generally by the numeral 10, is shown in FIG. 1, and, by way of example, can be of the multi-purpose saw type sold under the trademark HOMELITE as model DM-54. The rotary saw 10 includes a motor housing 12 containing a motor assembly (not shown) such as for example an air cooled, 2-cycle, single cylinder loop scavenged internal combustion gasoline engine, a motor frame or chassis 14, an air filter 16, a throttle handle 18 and throttle trigger 20, handle bars 22 and 24 and drive case cover 26. As discussed hereinafter the drive case cover 26 is removably attached to the chassis 14 by nuts 27 and 28 which are secured to externally threaded studs 29 and 30. The handles are shown as comprising tubular handle 22 which extends transversely over the top of the motor housing 12 with sufficient space between the handle and the housing to accommodate the operator's hand, and tubular handle 24 which extends rearwardly from handle 22 and is attached to the housing 12. The handles are attached to the housing by suitable bolts not shown. The throttle handle 18 and trigger shaped throttle control 20 are associated so that the operator can control the speed of the engine while gripping the handle 18. The handle 18 and the portion 23 of handle 22 just to the left of handle 24 are located in a plane which passes through the center of gravity of the saw so that when the saw is handled it is essentially balanced and can be supported and minipulated with minimum effort and maximum convenience and safety.

An arm 32 projects forwardly from the same side of motor housing on which the drive shaft 34 projects. The arm 32 also referred to herein as the driven shaft arm, is removably secured to the motor housing 12 by means of studs 29 and 30, which are attached to the motor chassis 14 and extend through the elongated slot 36. Associated nuts 27 and 28 attach to the external ends of studs 29 and 30 to secure the arm and drive case cover in position. The drive case cover 26 is provided with apertures 38 and 40 through which the studs 29 and 30 pass. The opening of slot 36 is sufficiently long so as to permit adjustment of arm 32 in a lengthwise direction, forwardly and rearwardly, relative to the chassis to adjust the tension of the drive belt 42 by which the saw blade 44 is driven. Adjustment of the arm 32 is readily effected by cam member 46. When the drive case cover 26 is attached to the motor housing 12, adjustment of the arm 32 is accomplished by turning cam 46 clockwise so that it contacts the drive case cover 26 and moves arm 32 forward to increase belt tension. The cam 46 is then locked into position by a locking screw 48. Nuts 27 and 28 are then tightened securely to hold the arm 32 in the selected position. At the front end of the arm 32, a saw blade shaft 50 is rotatably supported by ball bearings 52. The saw blade shaft 50 extends transversely of arm 32 and is parallel to engine drive shaft 30. A drive belt pulley wheel 54 upon which the drive belt 42 is positioned is mounted on one end of shaft 50 and secured in position by locking nut 55. A circular saw blade is mounted on the other end of the shaft 50 by threaded nut 56. It is to be understood that the mounting and securing of the saw blade 56 to the shaft 50 includes inner and outer washers, spacer balls, retaining rings and blotters well known to those skilled in the art, such items having been omitted for simplicity of discussion. While the blade guard or cover 58 is shown enclosing somewhat more than 180° of the saw blade, it is to be understood the degree of coverage may be varied. The blade guard 58 has an inner side wall portion 60, an outer side wall portion 62 and an outer arcuate wall portion 64 as best seen in FIG. 5.

Figure 2:
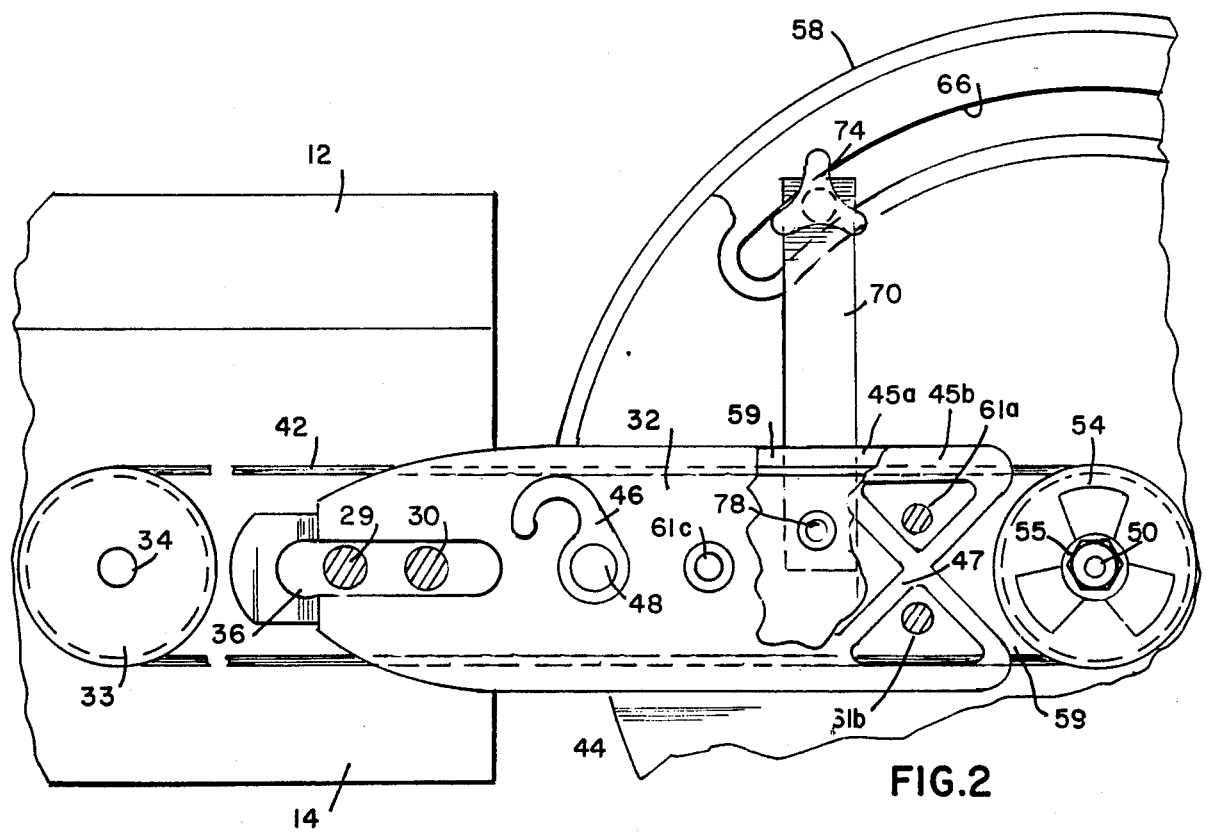
FIG. 2 is an enlarged fragmentary view of the portable rotary saw of FIG. 1 with the drive case cover and belt guard cover removed to illustrate the mounting of the drive shaft arm.
Figure 2A:
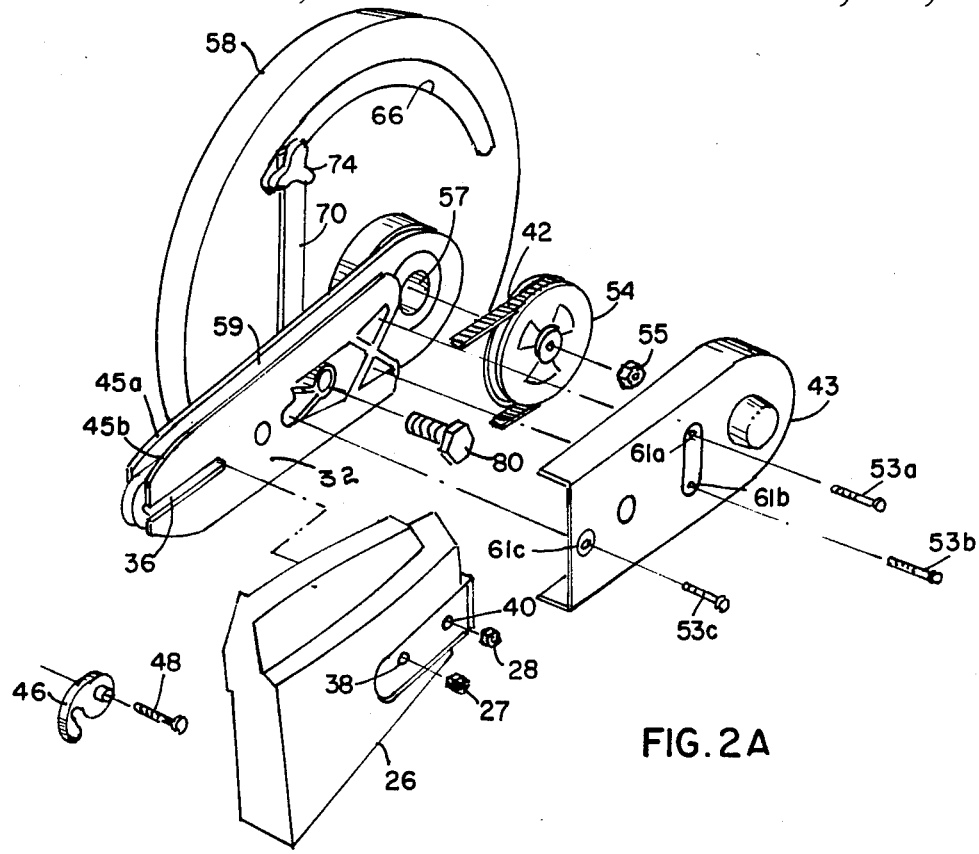
FIG. 2A is an exploded view illustrating the blade guard system of FIG. 1.

As best seen in FIGS. 2 and 2A the drive shaft arm 32 comprises two parallel elongated members 45a and 45b which are held in spaced relationship by spacer members 47 which extend the length of arm 32. As discussed above the slot 36 of the drive shaft arm 32 serves to receive the studs 29 and 30 when the arm is attached to the motor chassis 14. The aperture 57 serves to receive the saw blade shaft 50. The drive belt 42 is contained within the upper and lower channels 59 formed between elongated members 45a and 45b which also serve as belt guide means. Disposed upon the arm 32 is belt guard cover 43 which is removably attached to the arm 32 by screws 53a, 53b and 53c which are inserted into apertures 61a, 61b and 61c and screw into tap holes (not shown) in the arm 32.

Disposed about a portion of the inner side wall 60 and adjacent the outer arcuate wall portion 64, which forms the perimeter surface of the blade guard, is a track slot 66. In the preferred embodiment of the invention illustrated in FIGS. 4 and 5 the track slot 66 is formed in the arcuate wall member 68 attached about a portion of the peripheral surface of the inner wall 60.

The blade guard system of the present invention includes a blade guard adjustment arm 70 herein sometimes referred to as the guard adjust arm. The guard adjust arm 70 is attached at one end to the track slot 66 by attaching means such as adjusting bolt 72 and associated adjusting nut 74 by means of bolt receiving opening 75. It will be appreciated that when adjusting nut 74 is secured to tightly grip bolt 72 the blade guard 58 and blade adjust arm are secured to each other so that there is no relative movement, and, that when the guard arm adjust nut 74 is slightly loosened, the blade guard 58 and guard adjust arm 70 are then slidable relative to each other throughout the length of the track slot 66. Moreover, as will be discussed herein, the guard adjust arm 70 can be readily disengaged from the blade guard 58 by simply removing the adjusting nut 74 and slipping the adjust arm 70 off bolt 72. The bolt 72 is retained in the slot 66 by a conventional retainer ring or washer 73 disposed between the arm 70 and side wall 60. In the alternate embodiment illustrated in FIGS. 4 and 5 the bolt 72 is retained in the slot channel 76 formed between the inner side wall 60 and the track wall 68. The lower or other end of the guard adjust arm 70 is preferably provided with a spacer member 78 (as best seen in FIG. 5A) which is preferably secured to the guard adjust arm by such means as welding although suitable bolts can be employed. The other end of the space member is machined to receive a retaining feature such as bolt 80. As can be seen the spacer extends through the arm 32. It can be seen that when adjusting nut 74 is tightened the spacer member 78 and guard adjust arm 70 are tightly secured to the arm 32 and when loosened, the guard adjust arm can be rotated about the axis of the spacer member, the arc of rotation being limited only by the saw blade shaft 50.

Figure 3:
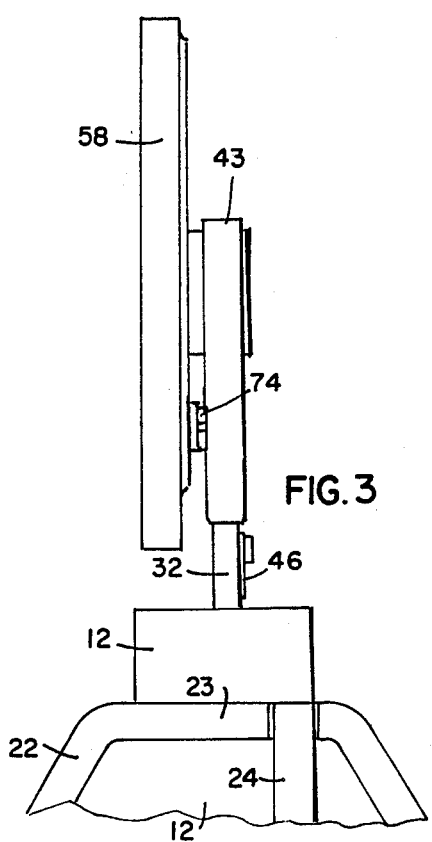
FIG. 3 is a fragmentary top plan view of the blade guard system of the present invention employed with the saw blade in the inboard position.
Figure 3A:
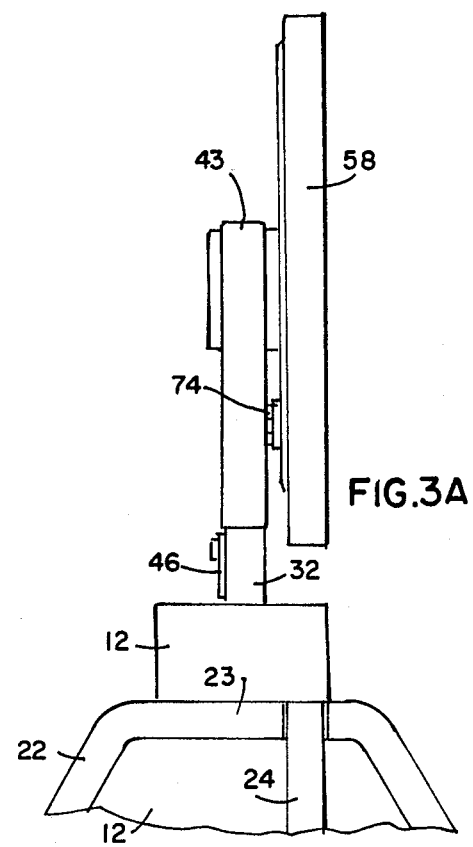
FIG. 3A is a fragmentary top plan view of the blade guard system of the present invention employed with the saw blade in the outboard position.
Figure 6:
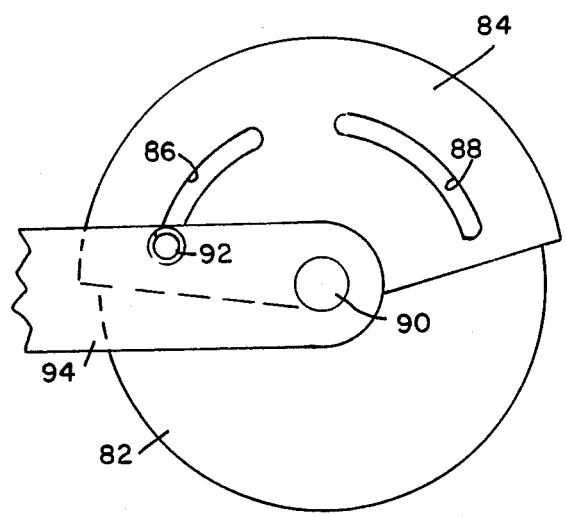
FIG. 6 is a fragmentary plan view of a prior art device.

Referring now to FIG. 6 of the drawing, there is shown an example of a prior art device. As illustrated, the blade 82 is provided with a cover 84 having two separate track slots 86 and 88 which are positioned relatively close to the blade shaft 90 to accomodate the blade guard adjusting nut 92 and bolt (not shown) which extends through the arm 94 and the blade guard 84 to releasably secure the blade guard 84 in position relative to the nut and bolt 92. In changing from the inboard position as illustrated (and as further exemplified by FIG. 3) to the outboard position (as exemplified by FIG. 3A) it is necessary to rotate the arm 94 and then remove blade guard adjusting bolt 92, the blade 82, and blade guard 84, reverse the blade guard and reattach the blade and blade guard to the blade shaft 90. After reversal, the guard adjusting bolt is reinstalled to track slot 88.

Figure 7:
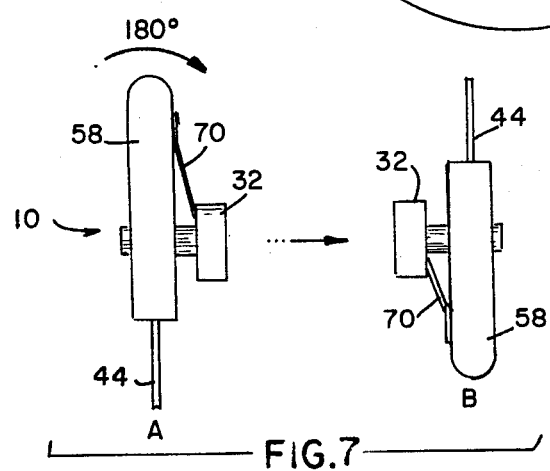
FIGS. 7 and 8 are schematic representations illustrating the operation of the blade guard system in accordance with the present invention.
Figure 8:
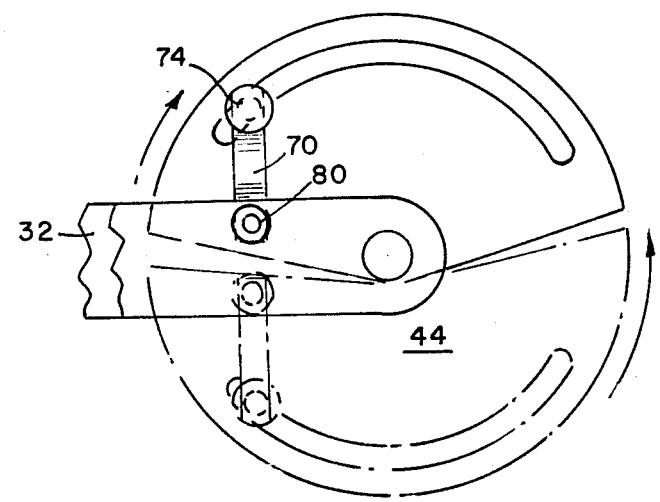

In contrast the change between inboard and outboard blade positions is accomplished simply and easily in accordance with the blade guard system of the present invention. In operation, reference being made more particularly to FIGS. 1, 7 and 9, nuts 27 and 28 are removed and then the drive case cover is removed. Removal of nuts 27 and 28 also releases the tension on the drive belt so that it can be removed from pully wheel 33. The arm 32 can then be removed from studs 29 and 30 and rotated 180° to change the blade from, for example, the inboard position A of FIG. 7, to the outboard position B of FIG. 7. In the outboard position B the blade guard is in the lower position covering the bottom position of the blade 44. At this point the operator removes adjusting nut 74 and disengages guard adjust arm 70 from the track slot 66 whereby the guard adjust arm 70 and blade cover 58 are easily rotated from their lower positions as shown by the dotted lines of FIG. 8 to the upper positions as shown by the solid lines. The guard adjust arm 70 is then reattached and adjusting nut 74 tightened to secure the blade guard in a desired protective position. The arm 32 can then be reinstalled on studs 29 and 30 and resecured by nuts 27 and 28 after the belt tension is adjusted as described herein. To change from the outboard position to the inboard position the same procedure is followed. It can be appreciated that the blade guard system of the present invention provides for a new and improved blade guard system which eliminates the need to remove the saw blade or belt guard when changing back and forth from inboard to outboard cutting positions. Additionally the blade guard system of the present invention requires only one track slot. Additionally in this respect it was discovered when the distance of the track slot from the blade shaft is maximized by positioning the track slot adjacent arcuate portion of the blade guard, improved resistance to material fatigue failure is obtained.

While the invention has been described with respect to preferred embodiments it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

We claim:

1. A blade guard system for power-driven rotary saws having a drive shaft arm supporting a saw shaft and saw blade and rotatable between inboard and outboard cutting positions comprising:
   a blade guard housing disposed about a portion of the saw blade having inner and outer side wall portions and an outer arcuate wall portion;
   means for rotatably attaching the inner housing wall to said saw shaft;
   an arcuate track slot disposed on said inner housing wall portion adjacent said outer arcuate wall portion;
   a blade guard housing adjustment arm;
   means for pivotally mounting one end of said adjustment arm to said drive shaft arm; and
   means for releasably attaching the other end of said blade guard adjustment arm at selected locations along said track slot to position said blade guard housing in a desired protective position;
   said adjustment arm when released from said track slot permitting rotation of said blade guard housing and said adjustment arm to a relative protective position when said blade is rotated between said inboard and said outboard positions.

2. A portable power-driven rotary saw comprising:
   a motor assembly including a motor having a chassis;
   a drive shaft projecting at one side of said chassis;
   a saw shaft arm extending forwardly from said one side of said chassis;
   a saw shaft rotatably mounted on one side of said arm;
   a saw blade mounted on said saw shaft;
   said arm being rotatable between inboard and outboard cutting positions;
   a blade guard housing disposed about a portion of the saw blade having inner and outer side wall portions and an outer arcuate wall portion;
   means for rotatably attaching at least the inner housing wall to said saw shaft;
   an arcuate track slot disposed on said inner housing wall portion adjacent said outer arcuate wall portion;
   a blade guard adjustment arm having upper and lower ends;
   means for pivotally mounting the lower end of said adjustment arm to said saw shaft arm; and
   means for releasably attaching the upper end of said blade guard adjustment arm at selected locations along said track slot;
   said adjustment arm when released from said track slot permitting rotation of said blade guard housing and said adjustment arm to a relative protective position when said blade is rotated between said inboard and said outboard cutting positions.

3. A portable power-driven rotary saw according to claim 2 wherein said arm comprises a pair of spaced elongated members and a driving connection means between said drive shaft and said saw shaft disposed in said spaced elongated members.

4. A portable power-driven rotary saw according to claim 2 or 3 wherein said blade guard adjustment arm further includes a spacer member attached to the lower end, said spacer member extending through the saw shaft arm and being rotatable therewith.

5. A blade guard system for power-driven rotary saws having a motor assembly, a drive shaft projecting at one side of said chassis, a drive shaft arm extending forwardly from said one side of said chassis, a saw shaft rotatably mounted on said drive shaft arm and extending to one side of said arm, a circular saw blade mounted on said saw shaft, driving connection means between said drive shaft and said saw shaft, said drive shaft arm being rotatable so as to rotate said saw shaft between inboard and outboard positions relative to said chassis, said blade guard system comprising:
- a blade guard housing disposed about a portion of the saw blade having inner and outer side wall portions and an outer arcuate wall portion;
- means for rotatably attaching the inner housing wall to said saw shaft;
- an arcuate track slot disposed on said inner housing wall portion adjacent said outer arcuate wall portion;
- a blade guard housing adjustment arm;
- means for pivotally mounting one end of said adjustment arm to said drive shaft arm; and
- means for releasably attaching the other end of said blade guard adjustment arm at selected locations along said track slot to position said blade guard housing in a desired protective position;
- said adjustment arm when released from said track slot permitting rotation at said blade guard housing and said adjustment arm to a relative protective position when said blade is rotated between said inboard and said outboard positions.

* * * * *